(12) United States Patent
Hall

(10) Patent No.: US 6,246,517 B1
(45) Date of Patent: Jun. 12, 2001

(54) LENSES FOR THE 1.50 TO 2.55 MICRON BAND

(75) Inventor: John M. Hall, Alexandria, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/339,290

(22) Filed: Jun. 24, 1999

(51) Int. Cl.[7] .................................................. G02B 13/14
(52) U.S. Cl. ............................................................ 359/357
(58) Field of Search ................................. 359/357, 356, 359/355, 350

(56) References Cited

U.S. PATENT DOCUMENTS

| 3,305,291 | * | 2/1967 | Snitchler | 359/357 |
| 4,147,040 | * | 4/1979 | Altman | 62/467 |
| 5,446,581 | * | 8/1995 | Jamieson | 359/357 |
| 5,940,224 | * | 8/1999 | Zhang | 359/350 |

OTHER PUBLICATIONS

Rudolf Kingslake, "Lens Design Fundamentals" Academic Press, London, 1978, pp. 243–250.*

* cited by examiner

Primary Examiner—Jon Henry
(74) Attorney, Agent, or Firm—Milton W. Lee; John E. Holford; Alain L. Bashore

(57) ABSTRACT

A lens assembly for near infrared comprising two double convex elements separated by two double concave elements. The first element being the most durable, the center elements being the least expensive and the last element having the greatest focussing power.

5 Claims, 6 Drawing Sheets

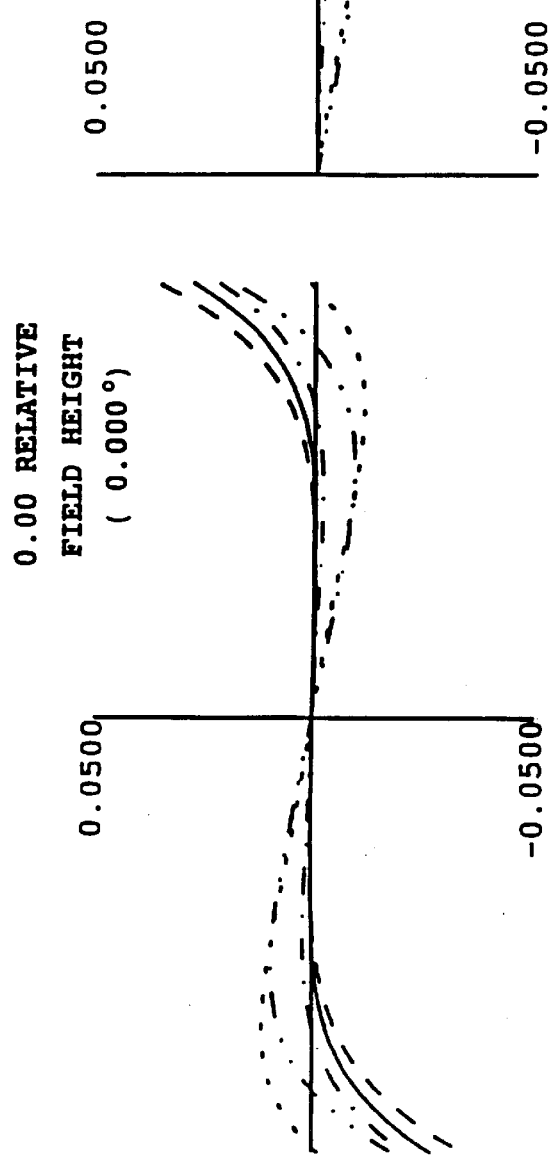
Fig. 3e
Fig. 3f
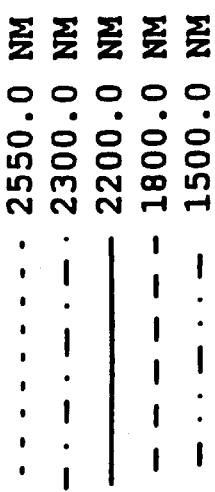
Fig. 3g

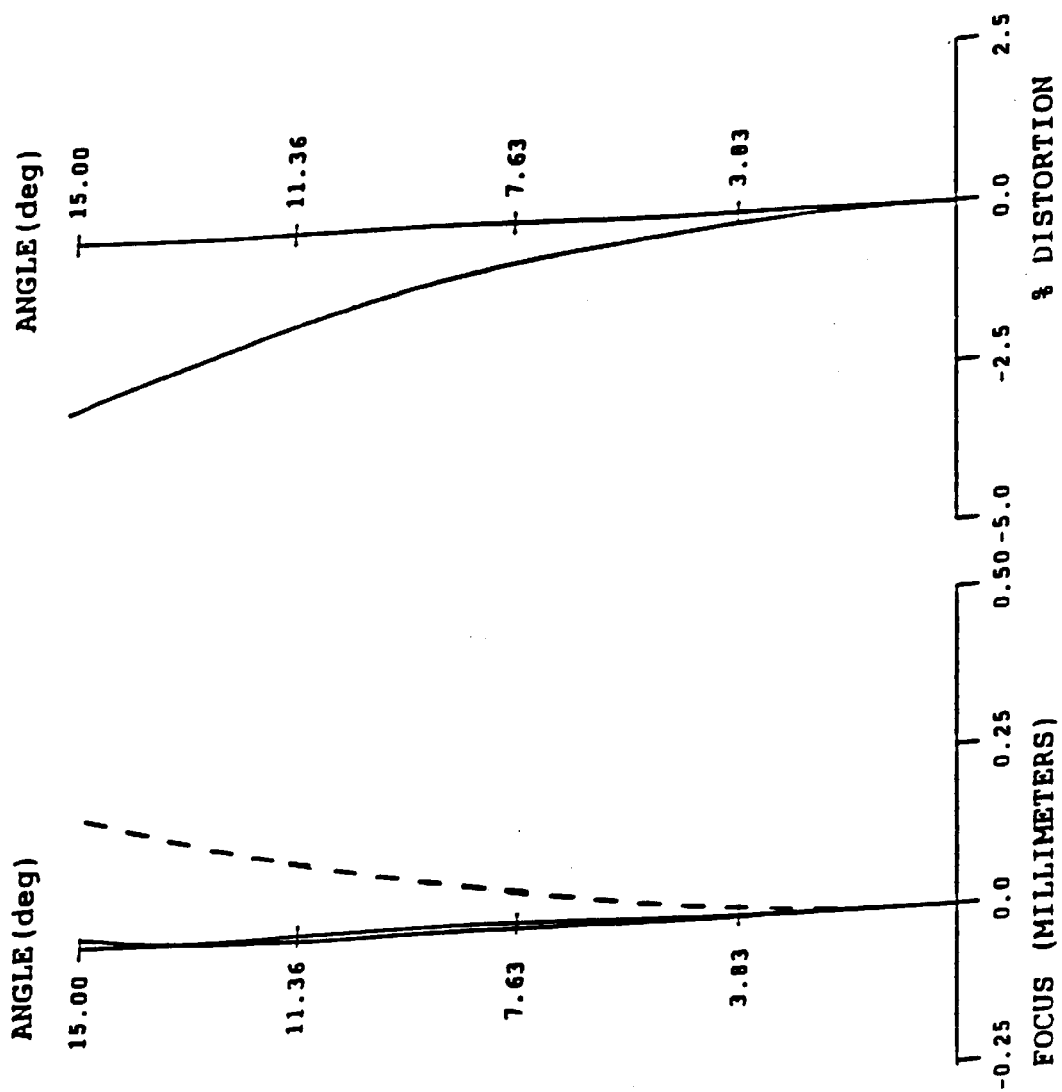

LENSES FOR THE 1.50 TO 2.55 MICRON BAND

BACKGROUND OF THE INVENTION

1. Field of the Invention

The present invention generally relates to lens systems for near infra-red imaging devices.

2. Description of Prior Art

With recent advances in charge coupled device (CCD) camera technology, it is now possible to fabricate focal plane detector arrays which are sensitive in the 1.5 to 2.55 micron spectral region. This spectral region features relatively good atmospheric transmission, and can capture energy from both reflective and thermally emissive objects at normal terrestrial temperatures. Most commercially available CCD camera lenses and night vision optics are optimized for use with wavelengths in the 0.6 to 1.0 micron band, and are not suitable for use with wavelengths in the 1.5 to 2.55 micron band. The lens materials are too lossy in the latter band and the corrections for chromatic and spherical aberrations are inadequate

SUMMARY OF THE INVENTION

An objective lens assembly for the 1.5 to 2.55 micron wavelength band including two positive lens elements separated by two negative lens elements. The first element is sapphire, the negative elements are fused quartz and the fourth element is zinc sulphide. This lens operates nominally at F/1.8 and provides a wide field of view with excellent resolution when imaging detector arrays of approximately 15 mm width and 25 microns or less pitch.

BRIEF DESCRIPTION OF THE DRAWINGS

The foregoing and other objects, aspects and advantages will be better understood from the following detailed description of a preferred embodiment of the invention with reference to the drawings, in which:

FIG. 3e is a rim ray plot of the tangential ray aberrations of the assembly for 0.0% field height or a half field angle of 0°;

FIG. 3f is a rim ray plot of the sagittal ray aberrations of the assembly for 0.0% field height or a half field angle of 0°;

FIG. 3g shows a key to the curves plotted in FIGS. 3a–3f giving the light wavelength for which each curve was plotted;

FIG. 4a shows a curve of focus vs half angle of view for the lens assembly.

FIG. 4b shows a curve of percentage distortion vs half angle of view for the lens assembly.

DETAILED DESCRIPTION OF A PREFERRED EMBODIMENT OF THE INVENTION

Figure 1:
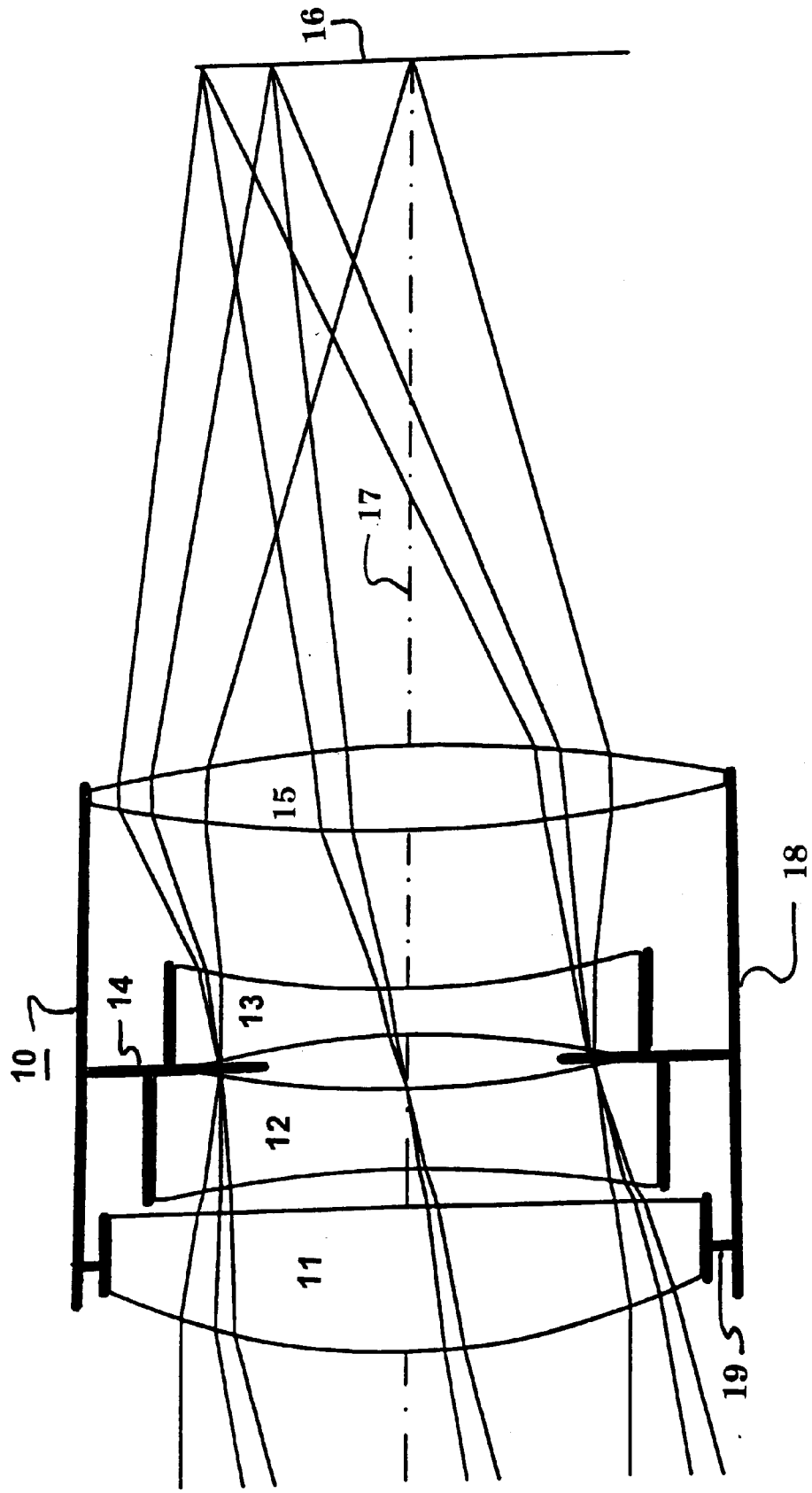
FIG. 1 is an edge view of the objective lens assembly with ray tracings of an edge, center and intermediate points of the projected image.

Referring now to the drawings, and more particularly to FIG. 1, there is shown an edge view of an objective lens assembly 10 for use in the spectral wavelength band from 1.5 to 2.55 microns in the near infrared. The overall design form is similar in function to a Cooke Triplet, but wherein the middle negative element is now split into two separate elements in order to reduce weight and improve image quality. The first element, which provides the first or input surface, is a double convex lens 11 made of sapphire. This material has a large index of refraction and provides low losses in the spectral band. from 0.4 to 5 microns. It also provides high durability against harsh environmental factors, i.e. wind blown sand, acid rain, temperature extremes, etc., to which the first surface of military optics is often exposed. The next two lenses 12 and 13 are totally enclosed are double concave and are made from fused quartz, which is much cheaper than sapphire, is well characterized throughout the intended spectral region, and is a commonly available glass material. A lens aperture stop element 14 is located between the two fused silica lenses, and no vignetting of the off-axis entrance pupils is required. The stop element may be a thin sheet of apertured metal or plastic with surfaces that absorb near infra-red. The fourth and final lens 15 provides the main focusing power of the assembly. It is a bi-convex positive lens made of Zinc Sulphide crystal, which provides excellent color correction over the spectral band. The back side has both spherical and conic curvature, the conic being required to reduce the amount of spherical aberration in the final focal plane 16. The size shape and spacing of these lens elements is found in Table 1. These elements are centered on a common optical axis 17 and held in place by a tubular housing 18, which can be stepped in diameter or may include ring-shaped supports like support 19 to accommodate the difference in the element diameters. As specified in Table 1, the lens assembly has the first order characteristics of f=1.8 and a focal length of 28.0 mm. It also provides a 30-degree field of view onto a 15 mm image plane format, and is capable of larger fields of view for larger formats. Table 2 gives the assembly's weight and center of mass, which is important in designing a camera or other device using this assembly. The lens performance is further detailed in FIGS. 2–4.

Table 1

Assembly Fabrication Data

| ELEM. NUMB. | RADIUS OF CURVATURE FRONT | BACK | LENS-GAP THICK. | APERTURE DIAMETER FRONT | BACK | GLASS TYPE |
|---|---|---|---|---|---|---|
| OBJ. | INFINITE | | INFINITY | | | |
| 12 | 23.1193 CX | .1000E21 CC | 5.0000 1.3163 | 18.5909 | 16.5272 | SAPH. |
| 13 | −43.5132 CC | 32.1170 CC | 2.8056 | 15.7252 | 13.0495 | SILICA |
| | APERTURE STOP | | 1.8945 | | 13.0495 | |
| 14 | −30.0000 CC | 30.0000 CC | 1.6000 5.4855 | 13.1086 | 14.5016 | SILICA |

-continued

| ELEM. NUMB. | RADIUS OF CURVATURE FRONT | BACK | LENS-GAP THICK. | APERTURE DIAMETER FRONT | BACK | GLASS TYPE |
|---|---|---|---|---|---|---|
| 15 | 45.4072 CX | A(1) | 3.0000 0.0000 | 19.9021 | 20.0003 | ZNS |
|  |  |  | 0.0000 | 19.7769 |  |  |
|  | IMAGE DISTANCE = | | 23.6181 | 19.7769 |  |  |
| IMAGE | INFINITE | | | 15.0052 |  |  |

TABLE 1 NOTES—Positive radius indicates the center of curvature is to the right. Negative radius indicates the center of curvature is to the left. Dimensions are given in millimeters. Thickness is axial distance to next surface. Image diameter shown above is a paraxial value; not a ray traced value. Other glass suppliers can be used if their materials are functionally equivalent to the extent needed by the design.

Aspheric Constant $$Z = \frac{[CURV]Y^2}{1 + [1 - K][CURV]^2 Y^{25}} + [A]Y^4 + [B]Y^6 + [C]Y^8 + [D]Y^{10}$$

| ASPHERIC | CURV | K | A | B | C | D |
|---|---|---|---|---|---|---|
| A [1] | 0.02162390 | −8.649994 | 0.0 | 0.0 | 0.0 | 0.0 |

Reference Wavelength=2200.0 nm
Spectral Region=1500.0–2550.0 nm

INFINITE CONJUGATES

EFL = 28.0000         ENTR PUPIL
BFL = 23.6181         DIAMETER = 15.5556
FFL = −11.1600        DISTANCE = 7.5919
F/NO = 1.8000         EXIT PUPIL
IMAGE DIST = 23.6181  DIAMETER = 23.2273
OAL = 21.1018         DISTANCE = −18.1910
PARAXIAL IMAGE HT = 7.5026
SEMI-FIELD ANGLE = 15.0000

FFL is measured from the first surface. BFL is measured from the last surface.

TABLE 2

Assembly weight and center of mass.

| ELEM. NUMB. | VOLUME | SPECIFIC GRAVITY | WEIGHT | CENTER OF MASS X | Y | Z |
|---|---|---|---|---|---|---|
| 11 | 1256.570 | 3.980 | 5.001 | 0.000 | 0.000 | 3.023 |
| 12 | 897.722 | 2.200 | 1.975 | 0.000 | 0.000 | 1.448 |
| 13 | 544.365 | 2.200 | 1.198 | 0.000 | 0.000 | 0.818 |
| 15 | 650.101 | 4.090 | 2.659 | 0.000 | 0.000 | 1.520 |

Total Weight=10.83265 grams
System Center of Mass=(0.000, 0.000, 8.935), Measured from the First Surface of System.

Figure 2:
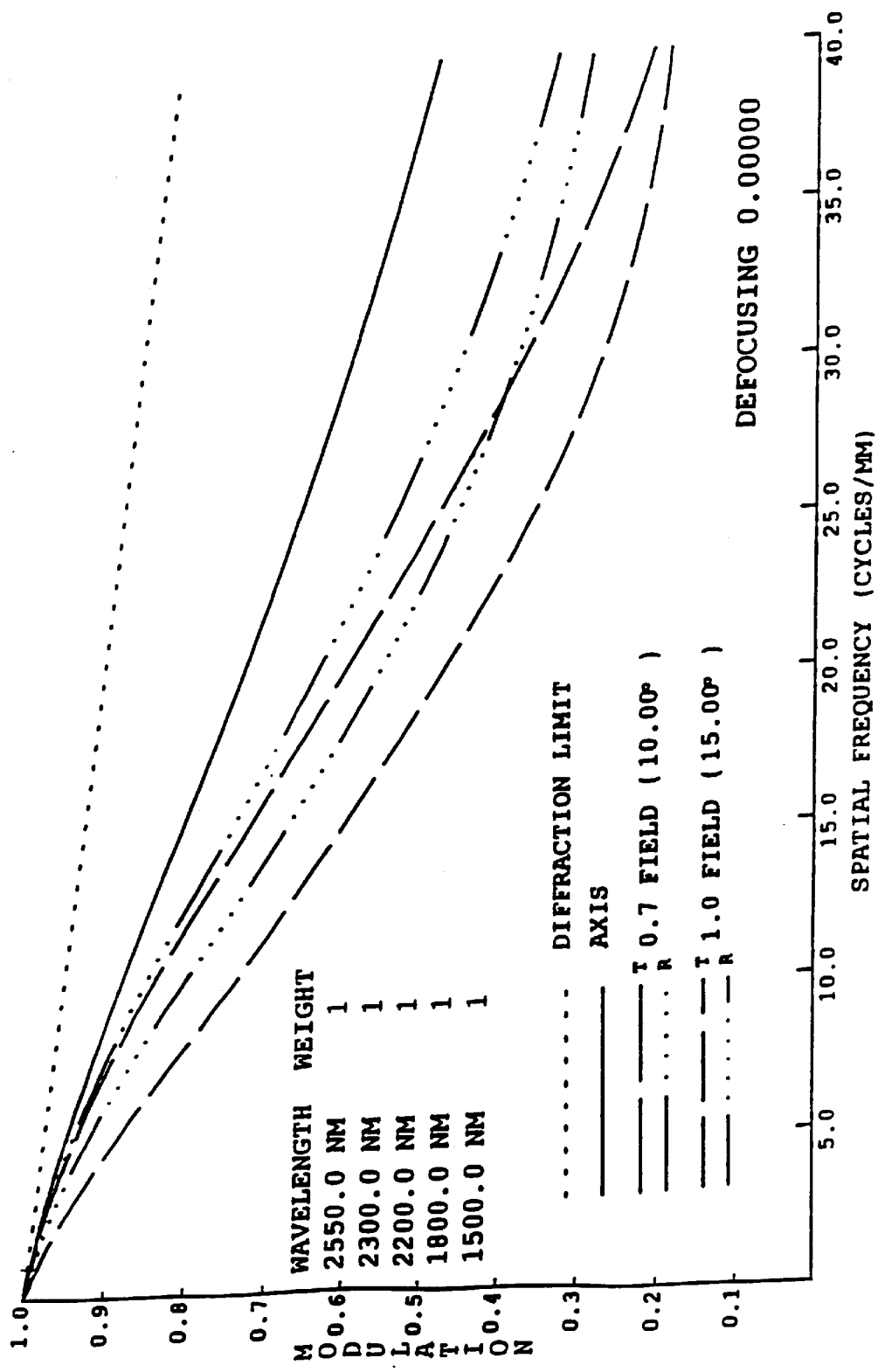
FIG. 2 is a graph of the modulation transfer function [MTF} of the assembly.

FIG. 2 shows the modulation transfer function (MTF) necessary to have near diffraction-limited resolution out beyond 20 line pairs per millimeter, which is the appropriate cut-off frequency for a detector array with 25 micron pitch.

In FIGS. 3a–3f, the data from rim ray plots of tangential and saggital rays show excellent chromatic correction over the entire pupil, and illustrate the gradual effect of geometric aberration as the field of view extends from 0 to 20 and then to 30 degrees.

Figure 3B:
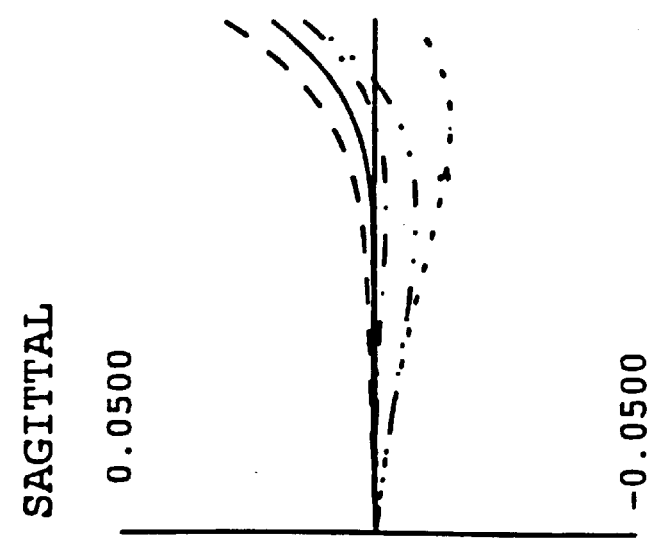
FIG. 3b a rim ray plot of the sagittal ray aberrations of the assembly for full field height or a half angle of 15°.
Figure 3A:
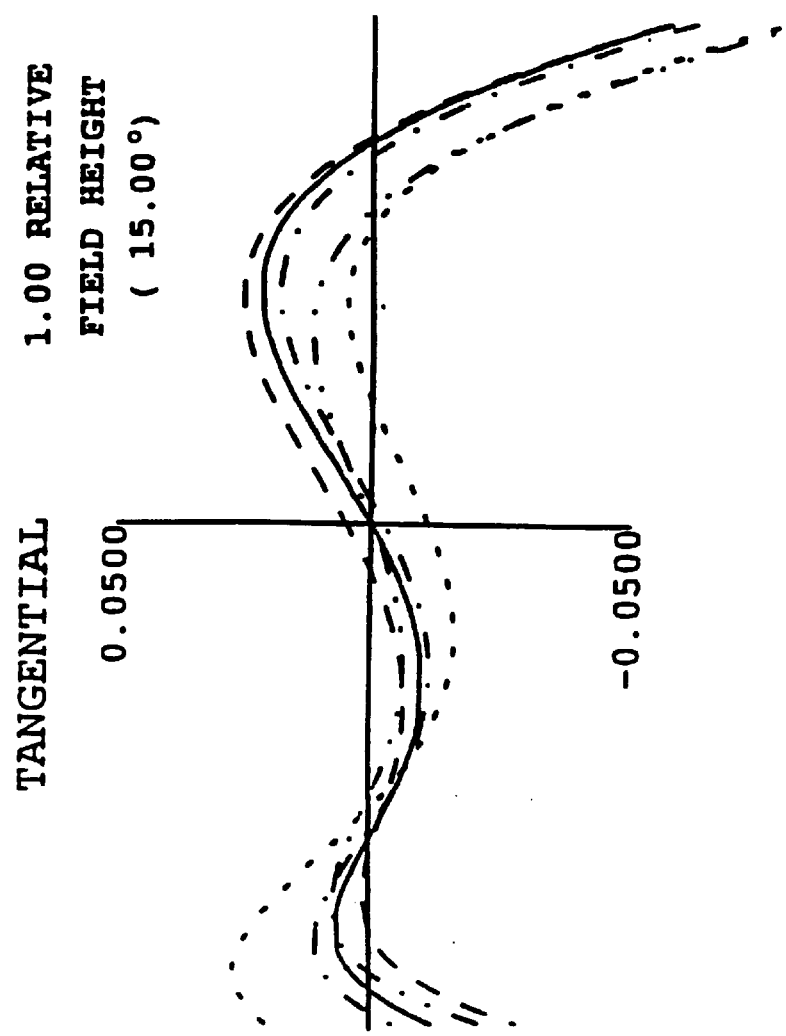
FIG. 3a rim ray plot of the tangential ray aberrations of the assembly for full field height or a half field angle of 15°.
Figures 3C, 3D:
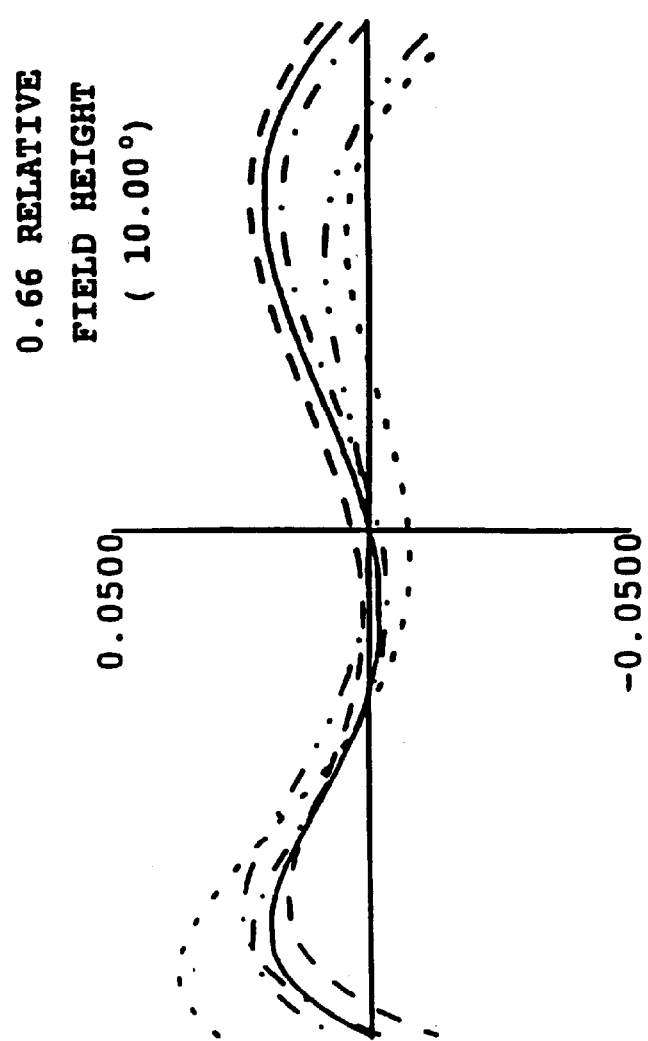
FIG. 3c is a rim ray plot of the tangential ray aberrations of the assembly for 66% field height or a half field angle of 10°.
FIG. 3d is a rim ray plot of the sagittal ray aberrations of the assembly for 66% field height or a half field angle of 10°.

FIG. 3g provides the key for the various curves in FIGS. 3a–3f tying them to the infrared frequencies plotted.

In FIG. 4a the curve of focus vs half angle of view shows that astigmatism is a primary cause for MTF losses at the edge of the field of view.

In FIG. 4b the curve of percentage distortion vs half angle of view shows that distortion is held to less than 3% over the field.

In Table 2, the data indicated that the total "glass" weight of the elements as drawn in the ray trace would be slightly less than 11 grams.

While this invention has been described in terms of preferred embodiment consisting of four lenses, those skilled in the art will recognize that the invention can be practiced with modification within the spirit and scope of the appended claims.

Having thus described my invention, what I claim as new and desire to secure by Letters Patent is as follows:

1. An objective lens assembly for focussing light in the wavelength band from 1.5 to 2.55 microns, including:

a first and a second double convex lens element separated by first and second adjacent double concave lens elements, said lens elements being centered normally on a straight optical axis;

said concave lens elements made of fused quartz;

a thin opaque apertured stop element separating said double concave lenses;

the size shape and spacing of said elements being adjusted to provide a speed no slower than f1.8, a focal length of at least 28 cm, and at least a 30 degree field of view onto at least a 15 mm image plane; and an open ended tubular housing engaging only the edges of said elements to maintain their spacing and orientation.

2. An assembly according to claim 1, wherein:

the radius of curvature of said concave lens elements is not less than 30 mm.

3. An assembly according to claim 1, wherein:

said first convex lens element is made of sapphire.

4. An assembly according to claim 1, wherein:

said second convex lens element is made of zinc sulphide.

5. An assembly according to claim 1, wherein:

said second convex lens element is the most powerful lens element; and one surface of said second convex lens element is aspherically ground to provide a final correction of image aberrations.

* * * * *